No. 747,788. PATENTED DEC. 22, 1903.
J. J. SMITH.
DRYING APPARATUS.
APPLICATION FILED NOV. 8, 1902.
NO MODEL.
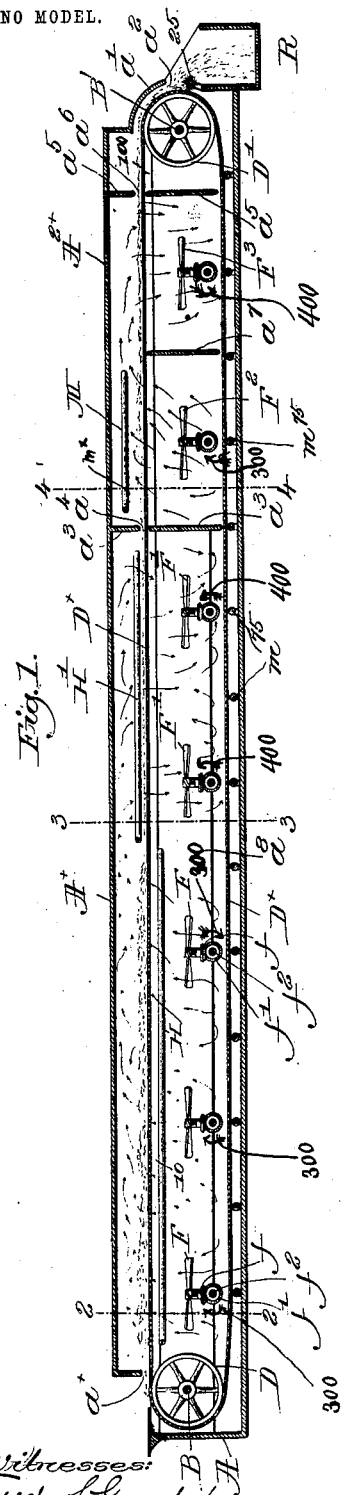
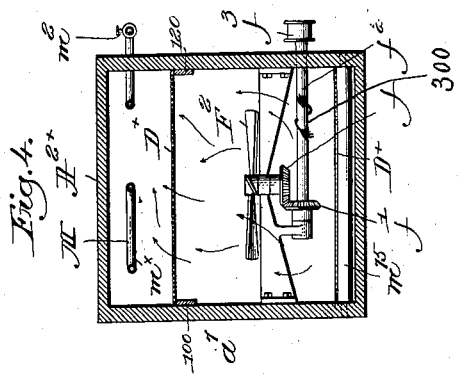
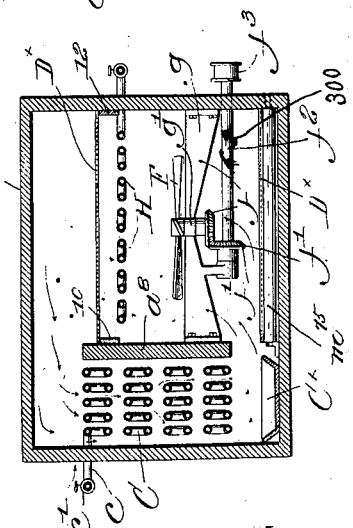

No. 747,788. Patented December 22, 1903.

UNITED STATES PATENT OFFICE.

JOHN J. SMITH, OF BOSTON, MASSACHUSETTS, ASSIGNOR TO THE AMERICAN CONDENSING DRIER COMPANY, OF KITTERY, MAINE, A CORPORATION.

DRYING APPARATUS.

SPECIFICATION forming part of Letters Patent No. 747,788, dated December 22, 1903.

Application filed November 8, 1902. Serial No. 130,491. (No model.)

*To all whom it may concern:*

Be it known that I, JOHN J. SMITH, a citizen of the United States, and a resident of Boston, county of Suffolk, State of Massachusetts, have invented an Improvement in Drying Apparatus, of which the following description, in connection with the accompanying drawings, is a specification, like letters on the drawings representing like parts.

In the preservation of vegetable and animal matter—such as food products, tobacco, &c.—evaporation has been heretofore employed in various forms of apparatus to expel the moisture from the material heated; but one of the great objections thereto is the practical elimination of the distinctive taste of the article treated. This is largely due to the fact that the degree of heat employed and the steady application of heat so expands the contained moisture of the material treated that the moisture-cells are burst or crushed, and while the moisture is undoubtedly extracted the essential oils or essences, which give the characteristic taste or flavor to an article, are also eliminated.

In my present invention, which in the embodiment herein shown is particularly adapted for drying tobacco or other leaf-like material, the extraction of the moisture is effected without changing the cell formation of the material treated. So long as the material is then maintained free from moisture it can be kept indefinitely, and when permitted to take up moisture it returns to its original condition, inasmuch as its cell structure has been unharmed and none of its essential oils or essences extracted.

The apparatus is also, with slight changes in manipulation, well adapted for the treatment of small fruits—such as currants, berries, &c.—potatoes, onions, spinach, eggs, and various fish and animal food products.

In the present embodiment of my invention an endless foraminous or perforated traveling carrier or apron is mounted within a closed elongated chamber, and a strong current of dry air is heated by being passed over heating pipes or coils in close proximity to the carrier and then is directed upon and drawn through the material, the latter being fed onto the upper run of the carrier at one end of the chamber. As the air traverses the material the warmer and cooler portions of the air commingle therein and absorb the moisture contained in the material, and the moisture-laden air is immediately drawn away and brought into contact with condensing means, the moisture in the air being thereby condensed and dripping into a suitable receptacle. The dried air then is reheated in close proximity to the material and again brought into contact with the material on the carrier, this process continuing as the material traverses the chamber, so that gradually it is divested of its moisture and left perfectly dry.

In my studies and experiments relating to the drying of organic material I have found that the destruction of the cell structure appears to be due to a continued or steady application of heated air thereto, so that a steady current of heated air, even if continually drawn off as it gathers or absorbs moisture, will expand the moisture in the cells and burst or disrupt the latter. This result I believe to be due to the fact that the expansion of the contained moisture is effected at such a rate that the cellular structure cannot adapt itself thereto at the same rate, and hence becomes ruptured, so that the material will not retain its original taste and color. I have also discovered that if such material be subjected to intermitting action of heated air—that is, by warming up and expanding the contained moisture, retarding the expansion, then expanding again, and so on—the moisture will be finally eliminated without rupture of the cells, this action appearing to allow the cellular structure to gradually accommodate itself to the expansion of the moisture therein. This may be likened in some degree to the action of a rapid puff of air directed into a soap-bubble or a thin rubber balloon, which instantly ruptures the sphere, whereas if the air be introduced slowly, giving time for the film or the rubber to stretch, the sphere may be expanded to large diameter and extreme thinness.

In applying my discoveries to practical use I have found that the alternating expansion and retarding or arresting of the expansion can in its effect be produced by subjecting cellular material to the action of air which is not of one uniform temperature—that is to say, if the air be heated by passing it rapidly between steam pipes or coils arranged in close proximity to the material such portions of the air as pass in immediate contact with the piping will be heated sufficiently to induce expansion of the moisture contained in the cells; but the portions of the air not contacting with the piping will be cooler. These cooler portions when impinging upon the material act to arrest the expansion set up by the warmer portions, and when this action is continued for a sufficient period, the moisture-laden air being withdrawn, the material will be dried with its cell structure intact. The moisture-laden air withdrawn from the material will be of practically uniform temperature, the portions of the air of higher and lower temperatures commingling within the material. Owing to the low degree of heat necessary and the rapidity of the process, neither fermentation nor rupture of the cell structure can take place.

The various novel features of my invention will be fully described in the subjoined specification and particularly pointed out in the following claims.

Figure 1 is a longitudinal sectional view of one form of apparatus for practicing my invention. Fig. 2 is an enlarged transverse section on the line 2 2, Fig. 1, looking toward the right. Fig. 3 is a similar view on the line 3 3, Fig. 1; and Fig. 4 is also a transverse section on the line 4 4, Fig. 1, looking toward the right.

Referring first to Fig. 1, an elongated and substantially closed chamber $A^x$ $A^{2x}$, substantially rectangular in cross-section, has mounted in suitable bearings near its ends transverse shafts B B', on which are secured drums D D', respectively, and an endless foraminous or reticulated carrier or apron $D^x$ is mounted upon the drums.

It will be seen by reference to Fig. 1 that the part $A^x$ of the chamber is formed with a jog or longitudinal extension A, in which drum D is located, the cover-plate $a$ of said extension being extended nearly to the surface of the carrier, and a clearance $a^x$ is left above the upper run of the carrier or apron to admit the material to be treated, said material being fed across the plate $a$ onto the carrier. At its opposite or discharge end the part $A^{2x}$ of the chamber is provided with a hood $a'$, which extends over a portion of the periphery of the drum D', the opening $a^2$ at the lower end of the hood permitting the discharge of the material into a suitable receptacle R.

In the present embodiment of my invention the chamber is provided with a transverse partition $a^3$, which may be about one-third of its length from the discharge end, said partition extending downward from the top of the chamber to near its bottom, with a split-like opening $a^4$ for the upper run of the carrier, the lower run traveling below said partition. A second and similar partition $a^5$, having an opening $a^6$ for the upper run, is located near the drum D', as clearly shown in Fig. 1, and a transverse baffle-wall $a^7$ crosses the part $A^{2x}$ of the chamber between the partitions and between the upper and lower runs of the carrier. From the partition $a^3$ to the end wall of the extension A a longitudinal wall $a^8$ extends, the top of said wall rising slightly above the upper run of the carrier in the main portion of the chamber $A^x$. By reference to Figs. 2 and 3 it will be seen that said wall divides the main chamber $A^x$ into two parallel elongated compartments in communication at top and bottom of the wall, the carrier moving in the larger compartment, and in order to support the upper run of the carrier guide-ledges 10 12 are secured to the wall $a^8$ and the opposite side wall of chamber $A^x$, respectively, the carrier being as wide substantially as the larger elongated compartment. Similar ledges 100 120 are provided in the part $A^{2x}$ of the chamber, such part being narrower than the main part (see Fig. 4) and extending from the partition $a^3$ to the discharge end, the lower run of the carrier traveling over rollers $m^{75}$, adjacent the bottom of the closed chamber.

The drum D' is rotated in any suitable manner by mechanism (not shown) and at such a speed as will cause the carrier to travel at a slow rate through the closed chamber, the material fed onto the upper run of the carrier at the feed end (shown at the left, Fig. 1) being thus moved slowly and uniformly through the chamber to the head $a'$ and discharged through the opening $a^2$.

To clean the carrier and prevent any of the material sticking thereto, I have shown in Fig. 1 a revolving brush 25, driven in any suitable manner and adapted to not only clean the carrier, but to throw or direct the dried product into the receptacle R. This receptacle or bin may be provided with any well-known or suitable pressing device to press the dried material into compact form suitable for packing and storage or transportation; but inasmuch as the compressing mechanism for the dried material forms no part of this invention I have not illustrated the same herein.

In the smaller of the two elongated compartments in the main chamber $A^x$, I have placed condensing means, shown as a series of coils of piping C, through which any suitable cooling or refrigerating medium is passed to reduce the temperature of the condenser to the desired point, the refrigerating fluid entering the coil at $c$, Fig. 2, and controlled by a suitable valve $c'$, and after circulating through the various bends of the coils it may be withdrawn through the pipe $c^2$, Fig. 3, having a suitable controlling-valve $c^3$.

In the larger long compartment I arrange heating-coils, as H H', the coils H being located below the upper run of the carrier and quite near thereto, and these coils may extend a little more than half the length of the compartment, while the coils H' are placed above the upper run of the carrier and extend substantially to the partition $a^5$ and are also in close proximity to the carrier.

Cross-girths $g$, secured at their ends to the longitudinal wall $a^8$ and the opposite side wall of the main chamber A$^\times$ and at the lower part thereof, are provided with bearings $g'$ for the axes of suitable fans F F', each fan-axis having a beveled gear $f$ thereon in mesh with a similar gear $f'$, fast on a transverse shaft $f^2$, extended through the side wall of the main chamber and provided with a belt or other pulley $f^3$, so that the several shafts may be driven by means of a belt traversing the same exterior to the chamber A$^\times$. The fans F are located below the heating-coils H and are so constructed that they direct the blast or current upward rapidly against and through such heating-coils, while the fans F' are arranged as suction-fans or to produce a downdraft. The particular form of the fans is immaterial, however, provided the draft or current is rapid and upward along so much of the upper run of the carrier as is over the heating-coil H and downward along so much of the carrier-run as is below the heating-coils H'. The heating-coils are traversed by any suitable heating medium, preferably steam, and governed by a suitable valve $h$, Fig. 3, a sufficient degree of heat being provided to gradually and gently expel the moisture from the material upon the carrier. This material is passed over the heating-coil H, and the upward current of air caused by the fans F is heated by contact with the heating-coils H and passes through the upper run of the carrier and the material thereon, which is relatively heavy, largely by reason of its contained moisture, the portions of air contacting with the coils being higher in temperature than the portions of air further removed therefrom. These warmer and cooler portions or currents impinge upon and are arrested by the material on the carrier. The warmer portions act to expand the contained moisture, and thereby stretch the cellular structure of the material, while the cooler portions of the air arrest such expansion and stretching, giving the cell structure an opportunity to accommodate itself to the changing internal conditions. The portions or currents of air commingle within the material and pass therethrough, extracting or carrying along a certain portion of the moisture therefrom, and the moisture-laden heated air then comes in contact with the refrigerating or condensing means C, and the contained moisture is immediately condensed and drips from the coils C into a suitable drip pan or trough C$^\times$. The air which is thus dried and cooled falls toward the bottom of the closed chamber and is drawn from underneath the wall $a^8$ by suction of the fans F and is again driven through the heater and up through the material on the carrier to repeat the former process, the direction of the circulating currents of air being shown quite clearly by the arrows in Fig. 2.

It is to be understood that the constant changes in the internal structure of the material due to the action of the portions of the air of different temperatures are instantaneous, the expansive action and its arrest following each other in a sequence too rapid to be measured.

When the travel of the carrier brings the material below the heater H', such material has been divested of a large proportion of its moisture, and hence is much lighter in weight, and should the air-current be directed upwardly upon the material it would tend to cause it to fly about the chamber. To prevent this, the suction-fans F' are employed, and they act to draw the air from the top of the chamber down through the heater H' and through the material on the carrier, so that this air, which takes up the remaining moisture in the material in the manner described, is directed to the bottom of the chamber and beneath the bottom of the longitudinal wall $a^8$ to the condensing means to be cooled thereby and to have its moisture removed by condensation.

The suction induced by the fans F' acts to draw the air up through the condenser in this part of the chamber, and this cooled and dry air is again heated by contact with the heater H' before it again comes in contact with the material on the carrier. The downdraft of the dry and heated air acts to maintain the material being treated upon the carrier, and in Fig. 3 the general direction of the air-currents is shown by the arrows. By the time the material has reached the partition $a^3$ it will be practically divested of its moisture and in a thoroughly dry condition, but with its cell structure intact, and some material could then be immediately discharged and in condition for packing.

The apparatus herein shown is particularly adapted for treating tobacco, and should the leaves thereof be packed at once as they pass through the partition $a^3$ they would be in such a brittle condition that they would break into small pieces, and it is therefore necessary to restore a sufficient amount of moisture to the material to render it pliable enough to retain its shape and character without breaking when packed. To this end I have arranged the part A$^{2\times}$ as an ordering compartment or section to soften the previously-dried product preparatory to packing or baling. Between the partitions $a^3$ and $a^7$ an updraft-fan F$^2$ is located and driven in suitable manner to direct an air-current up through the upper run of the carrier and the material thereon, and above this portion of the ordering compartment or section I have placed a spraying-coil M, having fine perforations on its under part, as at $m^\times$, Fig. 4, to direct steam-jets, or it may be water or other liquid in a finely-divided condition or spray, upon the material as it passes beneath the coil M.

The amount of moisture directed upon the material is regulated by means of a valve $m^2$, Fig. 4, and the upward current of air caused by the fan $F^2$ acts to lift or agitate the material sufficiently to enable the various portions thereof to receive the proper amount of moisture.

Between the partitions $a^7$ and $a^5$ I have placed a downdraft-fan $F^3$ below the upper run of the carrier, (see Fig. 1,) and the downdraft produced thereby acts to suck or draw the slightly-moistened material down upon the carrier, so that it can pass readily through the transverse slot or aperture $a^6$ in the partition-wall $a^5$ and be discharged from the opening $a^2$ of the hood. This final downdraft serves to collect the material again in a layer more or less compact upon the carrier, so that it will be evenly and readily discharged.

The apparatus herein shown is exceedingly efficient and requires a small amount of power to operate it, as there is little or no back pressure to contend with, the small amount of outside air which is admitted through the entrance-opening $a^\times$ merely serving to take the place of such air as is discharged through the opening $a^2$ at the discharge end of the chamber. There is a constant and continuous changing of the air in the main chamber $A^\times$ from dry and heated air to warm moisture-laden air, and this is immediately transformed by the condensing or refrigerating means to dry and cool air, ready to be again delivered in a hot or warm and dry state upon the material being dried. The heat is not raised to such a degree as would cause such rapid evaporation of the contained moisture as would tend to break or fracture the cell structure of the material being treated, as it is obvious that even with the apparatus herein shown the heat could be made of sufficiently high temperature to effect such an undesirable result, and the passage of the material through the apparatus is sufficiently rapid to prevent any fermentation from being set up. Herein the fans F are rotated in one direction to provide an updraft for the air-current, and the fans F' are rotated in the opposite direction to provide a downdraft.

In Fig. 1 the fan $F^2$ is supposed to be rotated in the same direction as the fans F', and the fan $F^3$ is oppositely rotated.

If it is desired to treat other material by the apparatus herein shown and to deliver it in a completely-dried condition, it is only necessary to shut off the spraying device M and to stop the rotation of the fan $F^2$, as will be manifest from an inspection of the drawings and the foregoing description.

My invention is not restricted to the precise construction and arrangement herein shown, as the same may be modified or rearranged in various particulars without departing from the spirit and scope of my invention.

Having fully described my invention, what I claim as new, and desire to secure by Letters Patent, is—

1. In an apparatus of the class described, an elongated closed chamber, an endless, traveling, foraminous carrier therein to sustain upon its upper run the material to be treated, a heating-coil in close proximity to the said carrier, means to direct a rapid current of dry air through the coil and upon and through the material, to expel and take up moisture therefrom, and means to continuously condense the moisture and cool the air after it has acted upon the material, the dry cold air being again heated and directed upon the material.

2. In an apparatus of the class described, an elongated closed chamber, having a hot and a cold compartment, extended side by side and communicating at top and bottom throughout its length, means to convey the material along the hot compartment near its top, means to induce a rapid transverse circulation of air in the chamber, whereby the air laden with moisture from the material heated will be cooled and dried in the cold compartment, and pass therefrom in such condition to the hot compartment, and heating-coils in the latter in close proximity to the conveying means for the material, to act upon the dried and cooled air as it is directed upon the material.

3. In an apparatus of the class described, a closed, elongated chamber, an endless traveling carrier therein to support on its upper run the material to be treated, and means to alternately heat and cool a continuous current of air directed upon the material, the air when hot acting upon the material to take up moisture therefrom, and when cooled causing condensation of the contained moisture, the heating means being located in close proximity to the carrier to cause non-uniformly-heated air to impinge upon the material thereon.

4. In an apparatus of the class described, an elongated, closed chamber, having a hot and a cold compartment, extended side by side and in continuous communication at top and bottom throughout its length, means to convey the material along the hot compartment near its top, a heating-coil located in close proximity to the conveying means, a condenser in the cold compartment, and means to rapidly force air through the heating-coil and thence directly upon and through the material to be treated and thence to the cold chamber, the air being cooled and dried therein by the condenser, the dried and cooled air returning thence to the hot compartment to be again driven through the heating-coil upon the material.

5. In an apparatus of the class described, an elongated, closed chamber, an endless, traveling, foraminous carrier therein to sustain upon its upper run the material to be treated, a heater in close proximity to and extending longitudinally of the upper run of the carrier, a condensing-compartment communicating at top and bottom with the main portion of the chamber, and a fan in the latter, the fan effecting circulation of cold, dry air from the condensing-compartment into the main chamber and driving it rapidly through the heater, to impinge directly upon the material on the carrier and to pass therefrom to the condensing-compartment.

6. In an apparatus of the class described, an elongated, closed chamber having hot and cold compartments communicating at top and bottom throughout the length of said chamber, an endless, foraminous, traveling carrier in the hot compartment, to receive at one end material to be treated and to discharge it at the other end, means to direct a current of heated, dry air up through the material near the feed end of the chamber, means to direct a current of heated and dry air down upon the material as it approaches the discharge end of the chamber, the air as it passes through and in contact with the material extracting the moisture therefrom and passing thence to the cold compartment, and refrigerating means in the latter to cool the air and condense the moisture carried thereby.

7. In apparatus of the class described, a closed chamber, means to continuously move material to be treated from one to the other end of the chamber, means to cause a current of air to circulate continuously through the chamber to act upon the material to be treated, and means to rapidly and non-uniformly heat, and to cool and dry such current of air, the heating means being located in close proximity to the material whereby the material is subjected to the action of dry portions of warmer and cooler air, to extract its moisture while preserving intact the cell structure of the material.

In testimony whereof I have signed my name to this specification in the presence of two subscribing witnesses.

JOHN J. SMITH.

Witnesses:
JOHN C. EDWARDS,
MARGARET A. DUNN.